US008068716B2

(12) United States Patent
Khan et al.

(10) Patent No.: US 8,068,716 B2
(45) Date of Patent: Nov. 29, 2011

(54) ONE-STEP RECORDING APPARATUS FOR PORTABLE MEDIA PLAYERS

(75) Inventors: Mohammad Ayub Khan, Santa Clara, CA (US); Shahid Iqbal, Islamabad (PK); Abid Khan, Islamabad (PK); Muhammad Fayuz-ur Rehman, Islamabad (PK); Muhammad Israr Khan, Islamabad (PK); Syed Muhammad Ziauddin, Islamabad (PK); Haroon-ur Rashid, Islamabad (PK)

(73) Assignee: Streaming Networks (PVT.) Ltd., Santa Clara, CA (US)

( * ) Notice: Subject to any disclaimer, the term of this patent is extended or adjusted under 35 U.S.C. 154(b) by 1104 days.

(21) Appl. No.: 11/401,759

(22) Filed: Apr. 10, 2006

(65) Prior Publication Data

US 2007/0248326 A1    Oct. 25, 2007

(51) Int. Cl.
*H04N 5/765* (2006.01)
*H04N 9/80* (2006.01)
*H04N 5/92* (2006.01)
*H04N 5/917* (2006.01)
*G06F 15/16* (2006.01)

(52) U.S. Cl. ........ 386/232; 386/200; 386/231; 386/239; 386/326; 386/328; 709/231

(58) Field of Classification Search .............. 386/96, 386/109, 125, 200, 231, 232, 239, 326, 328; 709/232, 231; 725/131
See application file for complete search history.

(56) References Cited

U.S. PATENT DOCUMENTS

| | | | | |
|---|---|---|---|---|
| 5,915,066 A * | 6/1999 | Katayama | ......................... | 386/70 |
| 6,073,192 A * | 6/2000 | Clapp et al. | ..................... | 710/65 |
| 6,757,030 B2 * | 6/2004 | Umeda | ......................... | 348/734 |
| 7,046,137 B2 * | 5/2006 | Palmquist | ................ | 340/539.11 |
| 7,072,975 B2 * | 7/2006 | Kato | .............................. | 709/237 |
| 7,516,136 B2 * | 4/2009 | Lee et al. | .............................. | 1/1 |
| 2002/0023529 A1 * | 2/2002 | Kurakake et al. | ................ | 84/610 |
| 2002/0105861 A1 * | 8/2002 | Leapman | .......................... | 369/2 |
| 2002/0106189 A1 * | 8/2002 | Sato et al. | ........................ | 386/65 |
| 2003/0079038 A1 * | 4/2003 | Robbin et al. | ................. | 709/232 |

(Continued)

*Primary Examiner* — Thai Tran
*Assistant Examiner* — Hung Dang
(74) *Attorney, Agent, or Firm* — Firasat Ali, Creso Legal (57) ABSTRACT

A recording apparatus for recording audio-visual (A/V) contents directly from an A/V input source to a portable media player (PMP) is disclosed. The recorded A/V contents can be played back by the portable media player immediately upon stopping the recording. The recording apparatus does not involve the use of any intermediate computing or storage device other than the portable media player and the recording apparatus itself. The A/V contents for recording may come in the form of analog/digital signals or as digital data in compressed or uncompressed form from transmission and/or storage devices. Depending upon the nature of the input, the recording apparatus digitizes, encodes and/or transcodes the A/V contents and stores the processed A/V contents directly into the portable media player in playback ready format. The recording apparatus includes a one-button control interface for starting and stopping the recording of A/V contents to the portable media player. By clicking the button once, the process of recording the A/V contents into the portable media player is initiated. Optionally, elaborate control of the A/V recording parameters can be achieved through a configuration file. The type of encoders/decoders, bit-rates, duration of recording and other parameters can be set in the configuration file. The configuration file is stored in the portable media player or any other connected storage device. The recording apparatus provides both manual and automatic update mechanisms for play lists in the portable media player. In addition, the recording apparatus may also record and store A/V contents to storage devices other than a portable media player.

34 Claims, 10 Drawing Sheets

U.S. PATENT DOCUMENTS

| | | | |
|---|---|---|---|
| 2004/0250291 A1* | 12/2004 | Rao et al. | 725/131 |
| 2005/0008323 A1* | 1/2005 | Han | 386/37 |
| 2005/0265395 A1* | 12/2005 | Kim et al. | 370/485 |
| 2007/0192814 A1* | 8/2007 | Southerland et al. | 725/105 |

* cited by examiner

FIG. 14

ONE-STEP RECORDING APPARATUS FOR PORTABLE MEDIA PLAYERS

BACKGROUND

1. Field

The present invention generally relates to recording of audio/video (A/V) data and, more specifically, to an A/V recording device for use in connection with portable media players.

2. Background

The portable media player market has registered rapid growth in recent years. The sharp rise in the popularity of portable media players has raised the demand for new and additional media contents. With the increase in media contents, management of such contents for portable media players becomes more challenging.

Currently, there is no simple and low cost method for recording A/V contents onto portable media players on a real-time basis. Transferring A/V contents to a portable media player typically involves using a number of devices, such as, a computer, intermediate storage, and non-real-time processing, to perform steps like A/V data capture, encoding or transcoding to a desired format, and transferring the resultant data to the media player memory. Such transfer process is typically costly and time consuming.

Stand-alone media recorders that offer real-time recording capability may require multiple-step procedures in order to get the encoded data onto the portable media player. Some of these recorders come with on-board optical disc units and other mass storage devices, which increase their size and raise the overall price tag. Others do not offer wide interoperability and are accompanied by complementing media players. Still others only support recording to a removable medium for intermediate storage and require the removable medium be re-inserted into the portable media player for copy and playback.

Hence, it would be desirable to provide an A/V recording device that is, amongst other things, low cost, convenient to operate, and interoperable with different portable media players, and does not require the use of any intermediate storage device or computer.

SUMMARY

A system for facilitating transfer of audio/visual (A/V) data is disclosed. In one embodiment, the system includes an A/V input source configured to provide the A/V data, a portable media player, and a recording apparatus coupled between the A/V input source and the portable media player and configured to record the A/V data from the A/V input source to the portable media player in a format that is compatible with the portable media player. The recording of the A/V data is effected upon a user providing a single user interaction with the recording apparatus and without any other input from the user.

An apparatus for facilitating transfer of audio/visual (A/V) data is disclosed. The apparatus includes an input module configured to receive the A/V data from an A/V input source, a converter module configured to convert the received A/V data to a desired format, an output module configured to transfer the A/V data in the desired format to a portable media player for playback and/or storage, and a user interface module configured to receive a command from a user. The reception, conversion and transfer of the A/V data is effected upon receipt of a single command from the user via the user interface module and without any additional input from the user.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

One or more embodiments of the present invention will now be described. In one embodiment, the present invention provides a recording apparatus that is capable of recording analog and/or digital A/V contents directly to portable media players on a real-time basis. Alternatively, the recording can also be performed faster or slower than real-time. In one aspect, the recording apparatus provides a cost-effective and convenient way to allow users to record and transfer personal A/V contents to their personal portable media players, thereby improving the portability of the recorded contents.

Figure 1:
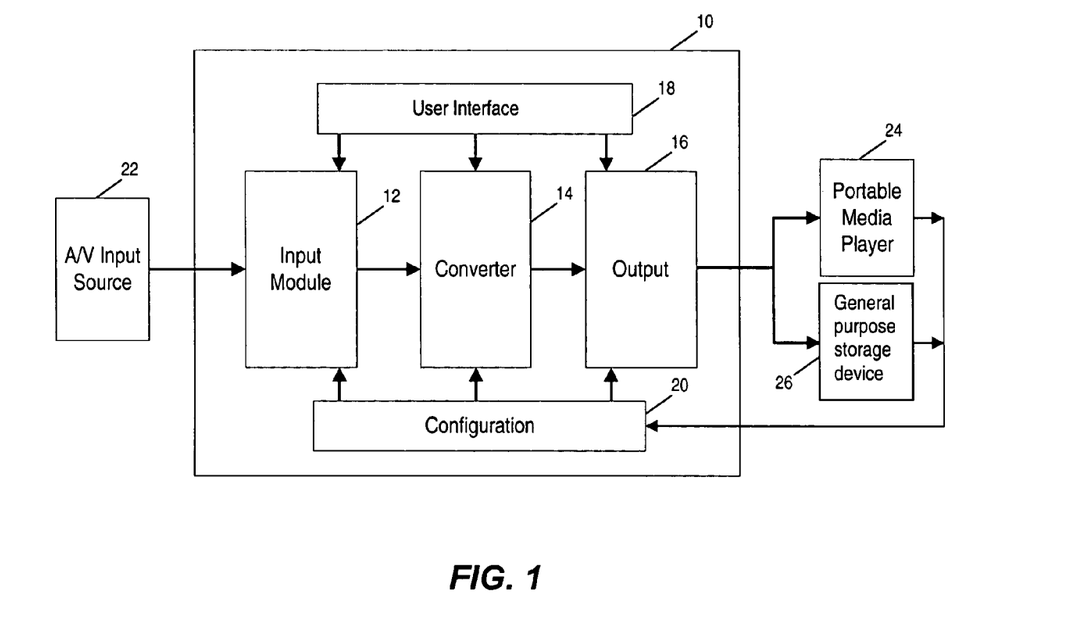
FIG. 1 is a simplified block diagram illustrating one embodiment of the present invention.

In one embodiment as shown in FIG. 1, the recording apparatus 10 comprises an input module 12, a converter module 14, an output module 16, a user interface module 18 and a configuration module 20. As will be further described below, the recording apparatus 10 is used to facilitate the transfer of A/V contents from an A/V input source 22 to a portable media player 24 and/or a general purpose storage device 26. The transfer can be effected simultaneously as the A/V contents are being played by the A/V input source 22. For example, in the case where the A/V input source 22 is a television, the A/V contents can be viewed by a user on the television in real-time while the transfer is being effected on the portable media player 24 and/or the general purpose storage device 26. Optionally, the A/V contents being recorded can also be played simultaneously on the portable media player 24 thereby allowing a user to watch what is being recorded onto the portable media player 24.

The input module 12 is configured to receive A/V contents in analog or digital form from the A/V input source 22. The A/V contents may be single-channel or multiple channel. The converter module 14 is configured to encode or transcode the A/V contents received by the input module 12 to a desired format. The output module 16 is configured to transfer the encoded or transcoded contents directly to a memory associated with the portable media player 24. The memory associated with the portable media player 24 may be internal or external to the portable media player 24. The recording apparatus 10 can also store its output to the general purpose storage device 26 other than the portable media player 24. The portable media player 24 and the general storage device 26 may comprise a hard disk, a random access memory (RAM), a compact flash, a secure digital (SD) card, a multi-media card, a memory stick, a flash drive or any other storage medium.

As noted above, the recording apparatus 10 captures A/V contents in analog/digital form from the A/V input source 22. The A/V input source 22 may include a video camera, a DVD player, a set top box, a VCR, a TV set, or any other media storage or transmission device. The recording apparatus 10 may use various video standards, such as, CVBS, S-Video, Component Video, RGB, DVI, HDMI, LVDS, ITU-R BT.656 and the like for analog/digital video input. The recording apparatus 10 may also use various audio standards, such as, I2S and PCM and the like for analog/digital audio input.

In the case of analog contents, such contents are captured by the input module 12 and suitably processed and digitized. In the case of digital contents, such contents are passed onto the converter module 14 with minimal processing.

The converter module 14 receives the output from the input module 12. The converter module 14 may be configured to handle any suitable audio and/or video compression method as provided by, for example, MPEG1, MPEG2, MPEG4, H.263, H264, AAC, MP2, MP3, AC-3 standards, or any other standard or proprietary compression algorithm. It is worth noting that the scope of the present invention is not limited by any encoder algorithm/architecture or A/V multiplexing algorithm/architecture. The converter module 14 compresses the A/V contents into a desired format and passes them onto the output module 16.

The output module 16 transfers and stores the compressed A/V contents directly to the memory associated with the portable media player 24 in playback ready form. The output module 16 may also transfer the compressed A/V contents to a general purpose storage device 26 other than the portable media player 24. The output module 16 may employ any wired or wireless means like USB, Ethernet, FireWire, Blue-Tooth, IrDA, Wi-Fi, or any other suitable protocol or standard for data transfer.

In another embodiment, the recording apparatus 10 receives compressed or uncompressed A/V contents in digital form from a computer, a set top box, or any other storage or transmission device. The input module 12 may employ USB, Ethernet, or any other appropriate wired or wireless means for data transfer. In the case of compressed data, the digital A/V contents are passed onto the converter module 14 that includes transcoding functions for decoding and re-encoding the A/V contents to and from any desired format, such as, MPEG1, MPEG2, MPEG4, H.263, H264, AAC, MP2, MP3, AC-3, or any other standard or proprietary format. In the case of uncompressed data, the decoding step is bypassed and the A/V contents are encoded by the converter module 14. It is worth noting that the scope of the present invention is not limited by any encoder or transcoder algorithm/architecture or A/V multiplexing algorithm/architecture. The encoded or re-encoded A/V contents are passed onto the output module 16.

The output module 16 transfers and stores the compressed A/V contents directly to the memory associated with the portable media player 24 in playback ready form. The output module 16 may also transfer the compressed A/V contents to a general purpose storage device 26 other than the portable media player 24. The output module 16 may employ any wired or wireless means like USB, Ethernet, FireWire, Blue-Tooth, IrDA, Wi-Fi, or any other suitable protocol or standard for data transfer.

The recording apparatus 10 further includes the user interface module 18 and the configuration module 20. The user interface module 18 is configured to accept input from a user. The input from the user may be used to control the operation of the recording apparatus 10. The configuration module 20 is configured to receive information including recording parameters from the portable media player 24 and/or the general purpose storage device 26 and use such information to configure the input module 12, the converter module 14 and the output module 16 so as to generate the output in the appropriate format for the portable media player 24 and/or the general purpose storage device 26. Alternatively, the configuration module 20 may also receive the information from other sources, such as, a download from a website on the Internet.

Figure 2:
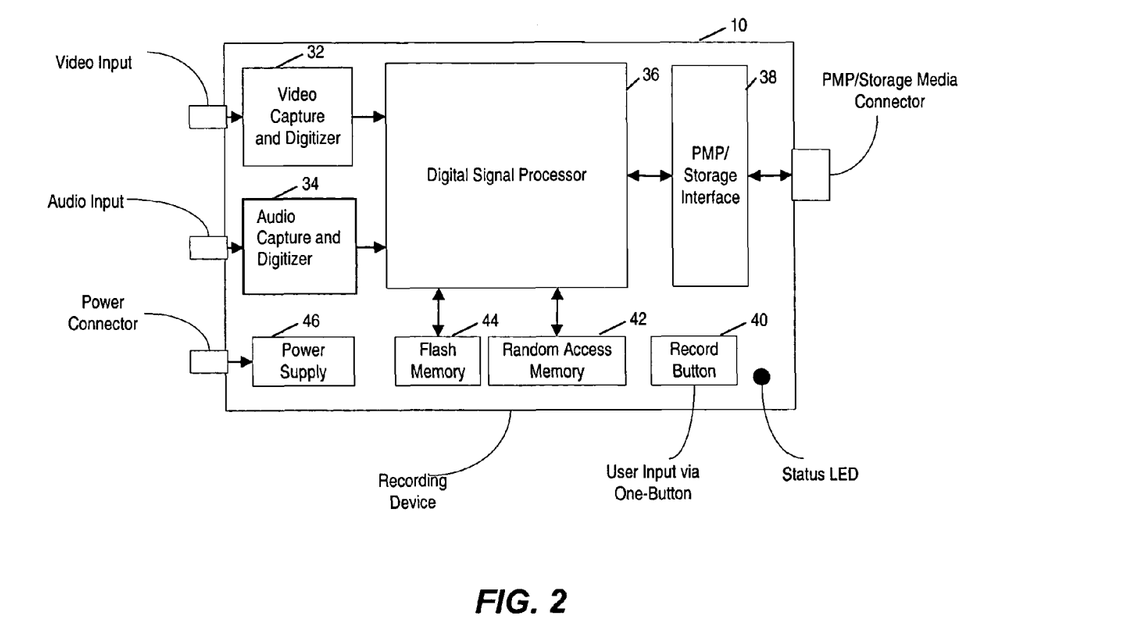
FIG. 2 is a simplified block diagram illustrating the hardware components of one embodiment of the present invention.

FIG. 2 illustrates another embodiment of the present invention. The recording apparatus 10 includes a video capture and digitizer 32, an audio capture and digitizer 34, a digital signal processor 36, a portable media player (PMP)/storage interface 38, a record button 40, a random access memory 42, a flash memory 44 and a power supply 46.

The video capture and digitizer 32 and the audio capture and digitizer 34 perform functions that are similar to those described above in connection with the input module 12. These digitizers 32, 34 receive video and audio inputs respectively from the A/V input source 22 (not shown in FIG. 2) and then render these inputs into digital form. Output from the digitizers 32, 34 is then forwarded to the digital signal processor 36 for processing into a desired format. Subsequently, output from the digital signal processor 36 is forwarded to the PMP/storage interface 38 for delivery to the portable media player 24 and/or the general purpose storage device 26 (not shown in FIG. 2).

The record button 40 is used by the user to initiate recording of the A/V contents from the A/V input source 22 onto the portable media player 24 and/or the general purpose storage device 26. In this embodiment, the user may simply press the record button 40 to initiate the recording operation by the recording apparatus 30 without any further action on the part of the user.

While the recording apparatus 10 is described above in connection with A/V contents, it should be understood that the recording apparatus 10 may also be used to record and store audio-only, video-only or still-image contents in a manner similar to that described for A/V contents.

Different embodiments of the present invention may contain features like dynamic source detection, whereby the selection of the appropriate A/V input source is made dynamically on the basis of the availability of the A/V signal; dynamic video standard detection, whereby the selection of NTSC/PAL/SECAM video standards is made automatically; automatic media detection, whereby the type and make of media storage device is detected automatically; and automatic portable media player detection, whereby different brands and makes of portable media players are identified automatically.

Different embodiments of the present invention may also provide support for FAT32, FAT16, HFS, HFS+, Ext2, Ext3, NTFS, or any other standard or proprietary file system. Moreover, embodiments of the present invention may support MP4, MOV, AVI, ASF, or any other standard or proprietary file format.

Certain embodiments of the present invention may use a remote control device for configuration and control. The remote control device may contain one or more buttons, which may be used to control some or all of the features or functions of the recording apparatus. One or more buttons may be housed on both the recording apparatus device and the remote control device or on either one of them. The remote control device may communicate with the recording apparatus through any wired or wireless means. One embodiment of the present invention may contain a docking station for interfacing with and/or holding a portable media player.

An embodiment of the present invention may contain a TCP/IP stack or any other suitable communication stack to allow for connection to one or more networked devices. In one embodiment, the A/V data provided by the A/V input source 22 is in digital bit-stream in compressed or uncompressed form streaming from a network device or source or read from the portable media player 24 or the general purpose storage device 26.

An embodiment of the present invention may further contain an RF tuner for receiving digital/analog broadcast signals. It may also be noted that although the present invention has been described in the context of a portable media player, an embodiment of the recording apparatus may easily record and store to any portable device that stores and plays back still-image, audio, video, or A/V contents, such as, a mobile phone or a PDA (personal digital assistant). Furthermore, the recorded A/V contents can also be played back by software media players on any non-portable devices, such as, a desktop computer and the like.

One embodiment of the present invention is a stand-alone device. However, it should be noted that there may be instances where the recording apparatus is housed in a host device, and the recording apparatus may even share some of the circuitry of the host device. The purpose of such an arrangement would be to enhance the functionality of the host device by providing the facility of direct recording of A/V contents to a portable media player. For example, in one embodiment, the recording apparatus may be housed in a set top box, a TV set, a camcorder, a video camera, a DVD player, a VCD player, a DVR, a VCR, or any other media player.

Figure 3:
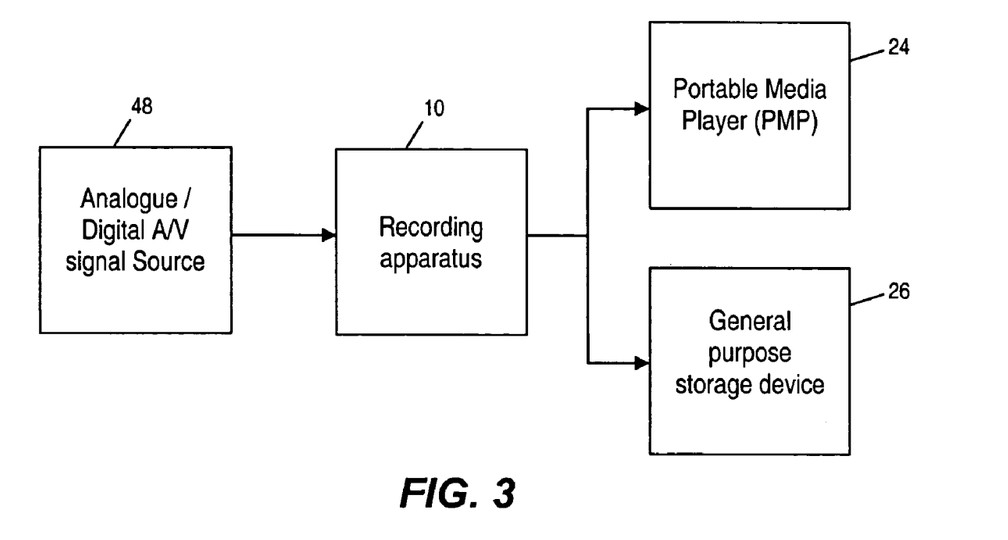
FIGS. 3-10 are simplified block diagrams illustrating various use scenarios according to different embodiments of the present invention.

The recording apparatus 10 of the present invention may be deployed in various situations, as depicted in FIGS. 3-10. In FIG. 3, the recording apparatus 10 receives and processes A/V contents from an analog/digital source 48. In this case, the recording apparatus 10 can utilize an appropriate A/V encoder to generate the output in a desired format. The recording apparatus 10 then forwards its output to the portable media player 24 and/or the general purpose storage device 26 for playback and/or storage.

Figure 4:
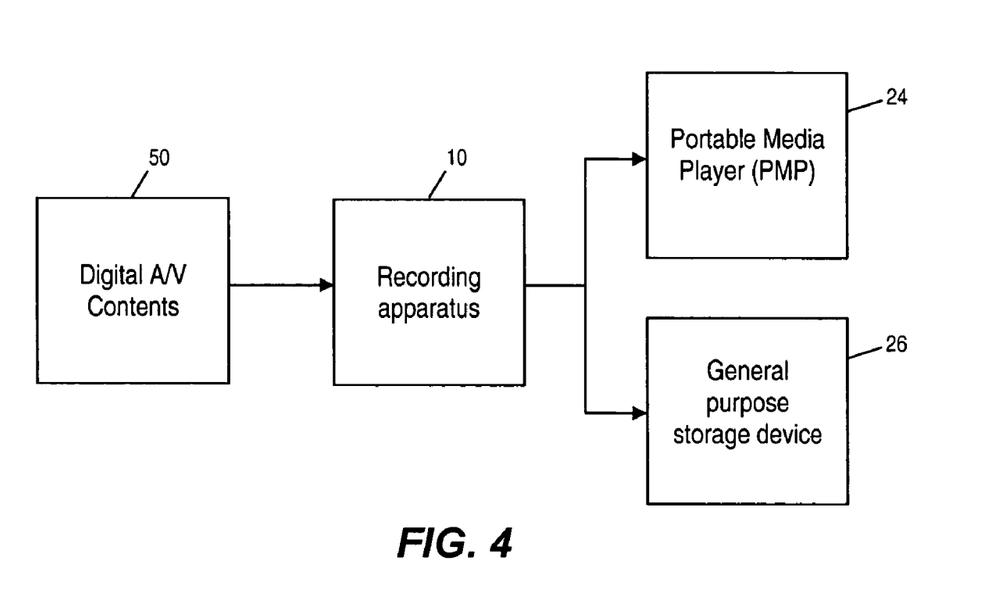

In FIG. 4, the recording apparatus 10 receives and processes digital A/V contents from a digital source 50. In this case, the recording apparatus 10 can utilize an appropriate A/V transcoder and/or A/V encoder to generate the output in a desired format. The recording apparatus 10 then forwards its output to the portable media player 24 and/or the general purpose storage device 26 for playback and/or storage.

Figure 5:
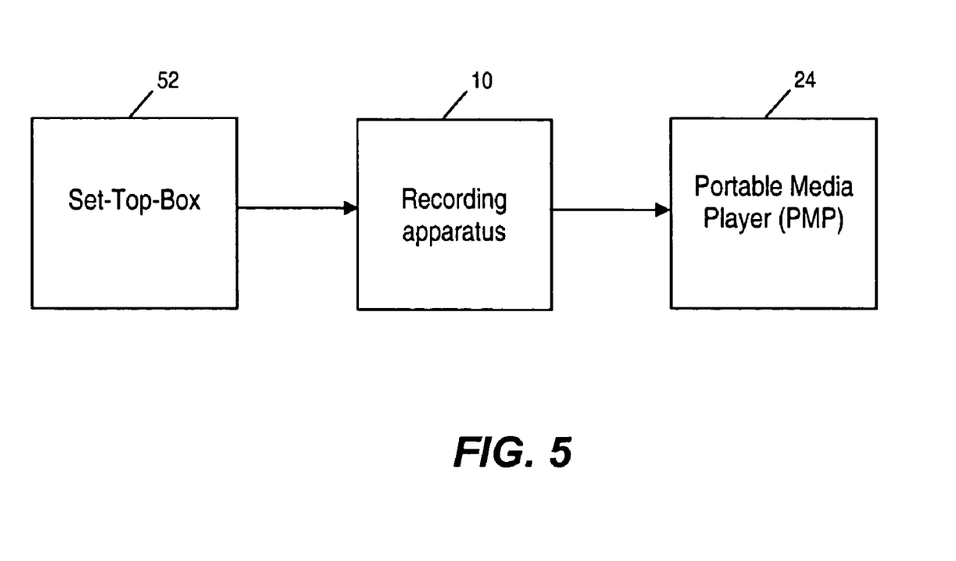

In FIG. 5, the recording apparatus 10 receives A/V contents from a set top box 52. The recording apparatus 10 processes the A/V contents and then forwards its output to the portable media player 24 for playback and/or storage.

Figure 6:
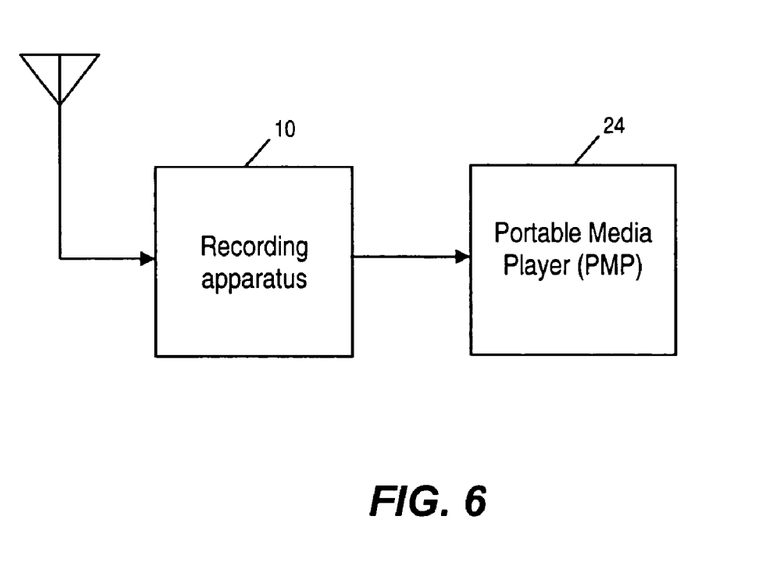

In FIG. 6, the recording apparatus 10 receives A/V contents transmitted over the air by a transmitting source (not shown). The recording apparatus 10 processes the A/V contents and then forwards its output to the portable media player 24 for playback and/or storage.

Figure 7:
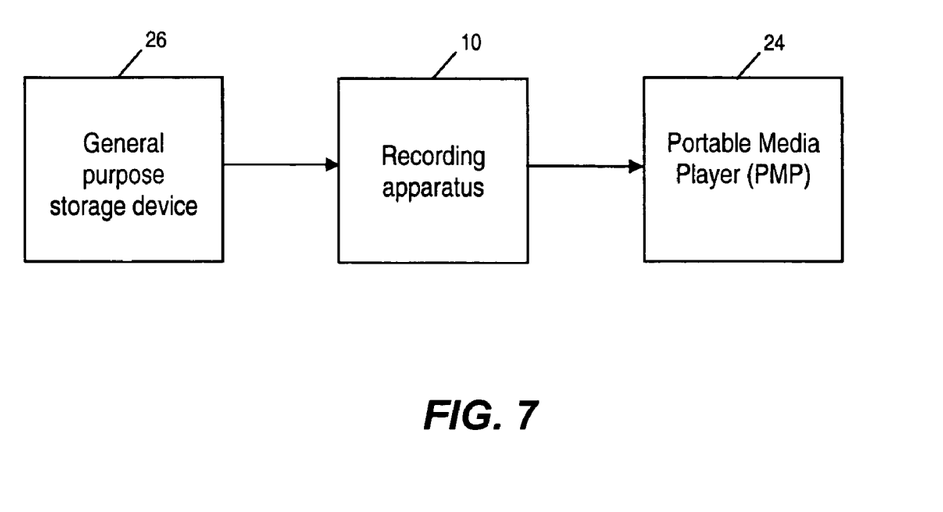

In FIG. 7, the recording apparatus 10 receives A/V contents from the general purpose storage device 26. The recording apparatus 10 processes the A/V contents and then forwards its output to the portable media player 24 for playback and/or storage.

Figure 8:
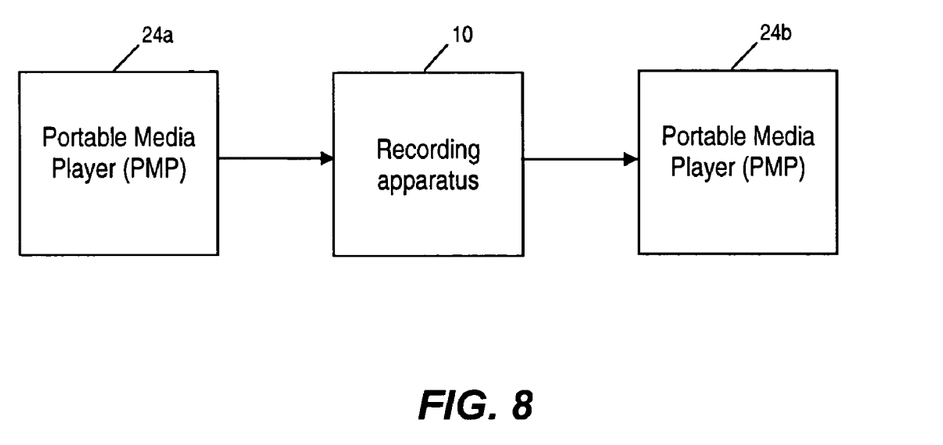

In FIG. 8, the recording apparatus 10 receives A/V contents from one portable media player 24a. The recording apparatus 10 processes the A/V contents and then forwards its output to another portable media player 24b for playback and/or storage.

Figure 9:
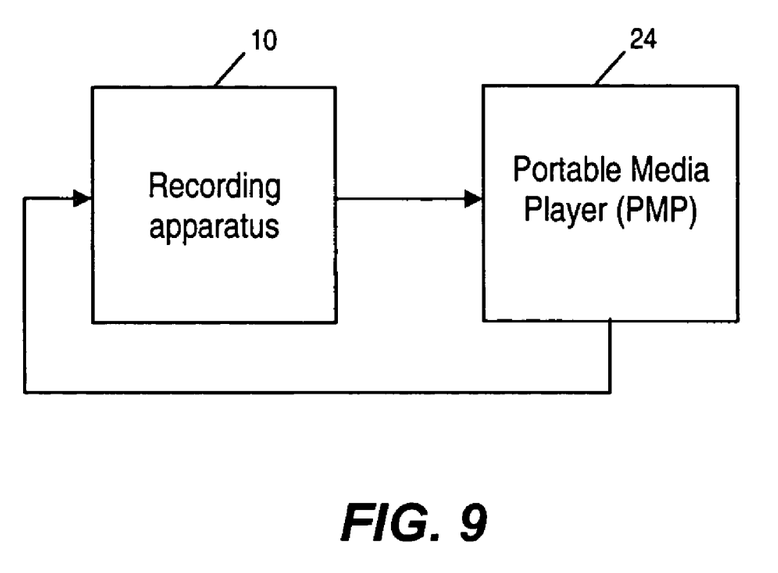

In FIG. 9, the recording apparatus 10 receives A/V contents from the portable media player 24 and then transfers the encoded/transcoded A/V contents back to the same portable media player 24.

Figure 10:
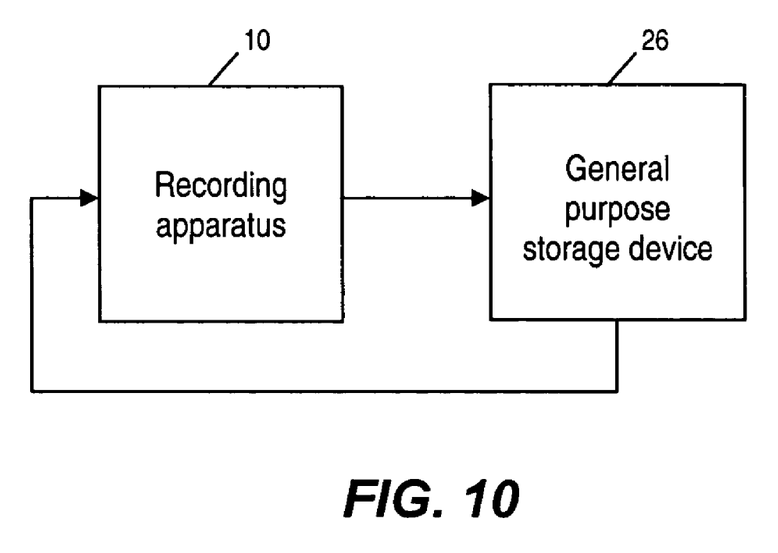

In FIG. 10, the recording apparatus 10 receives A/V contents from the general purpose storage device 26 and then transfers the encoded/transcoded A/V contents back to the same general purpose storage device 26.

Figure 11:
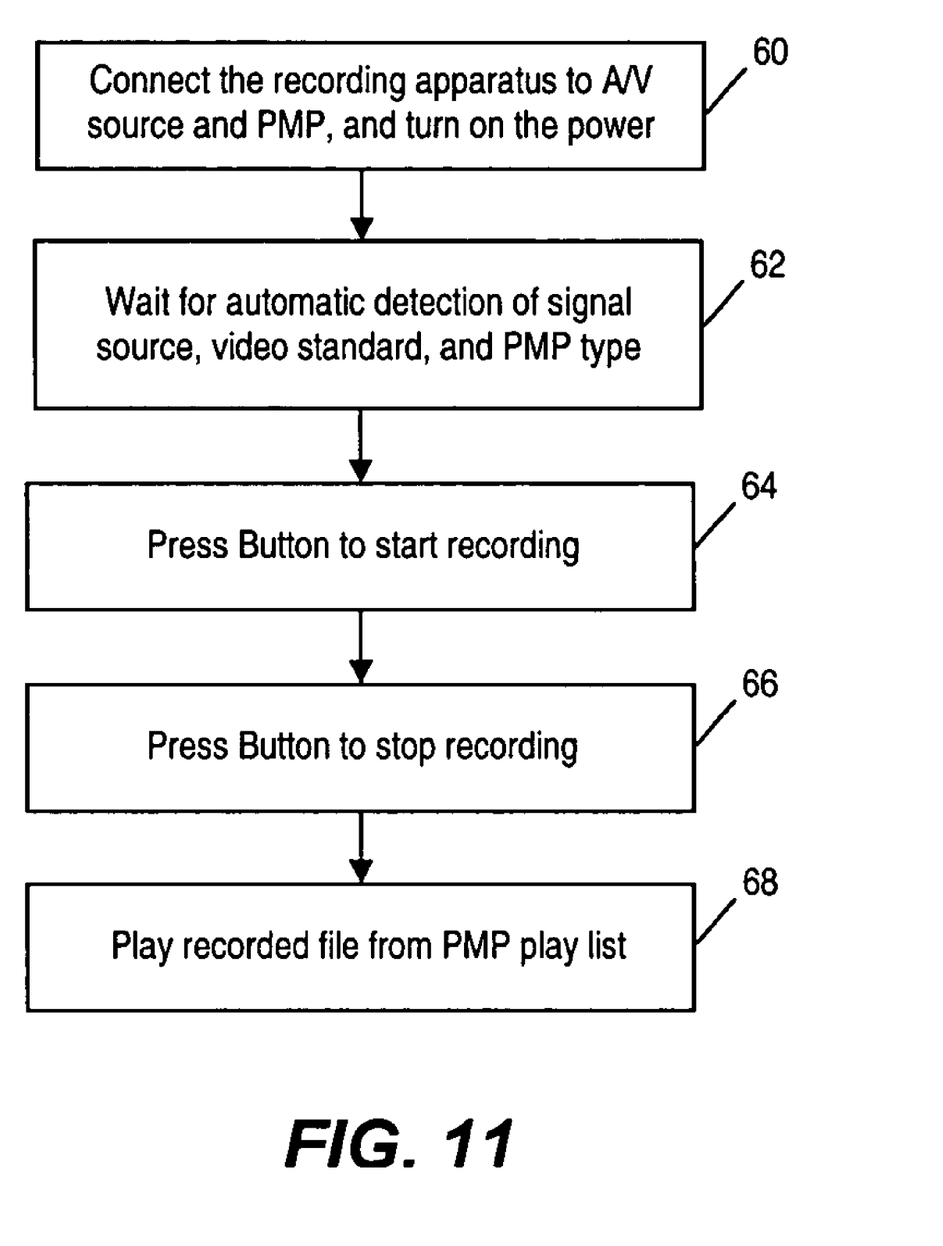
FIGS. 11-14 are flow diagrams illustrating various operational flows according to different embodiments of the present invention.

FIG. 11 illustrates one operational flow of one embodiment of the recording apparatus 10. At block 60, the recording apparatus 10 is connected to the A/V input source 22 and the portable media player 24. The recording apparatus 10 is then powered up. At block 62, the recording apparatus 10 performs its initialization procedures, such as, automatic detection of signal source, video standard and portable media player type. At block 64, the user activates the recording process by pressing the record button 40 on the recording apparatus 10. In response, the recording apparatus 10 processes and transfers the A/V contents from the A/V input source 22 to the portable media player 24 for playback and/or storage. At block 66, the user may discontinue the recording process by pressing the record button 40 again. At block 68, the user may then play the recorded A/V contents on the portable media player 24 by selecting the appropriate file from a play list.

Figure 12:
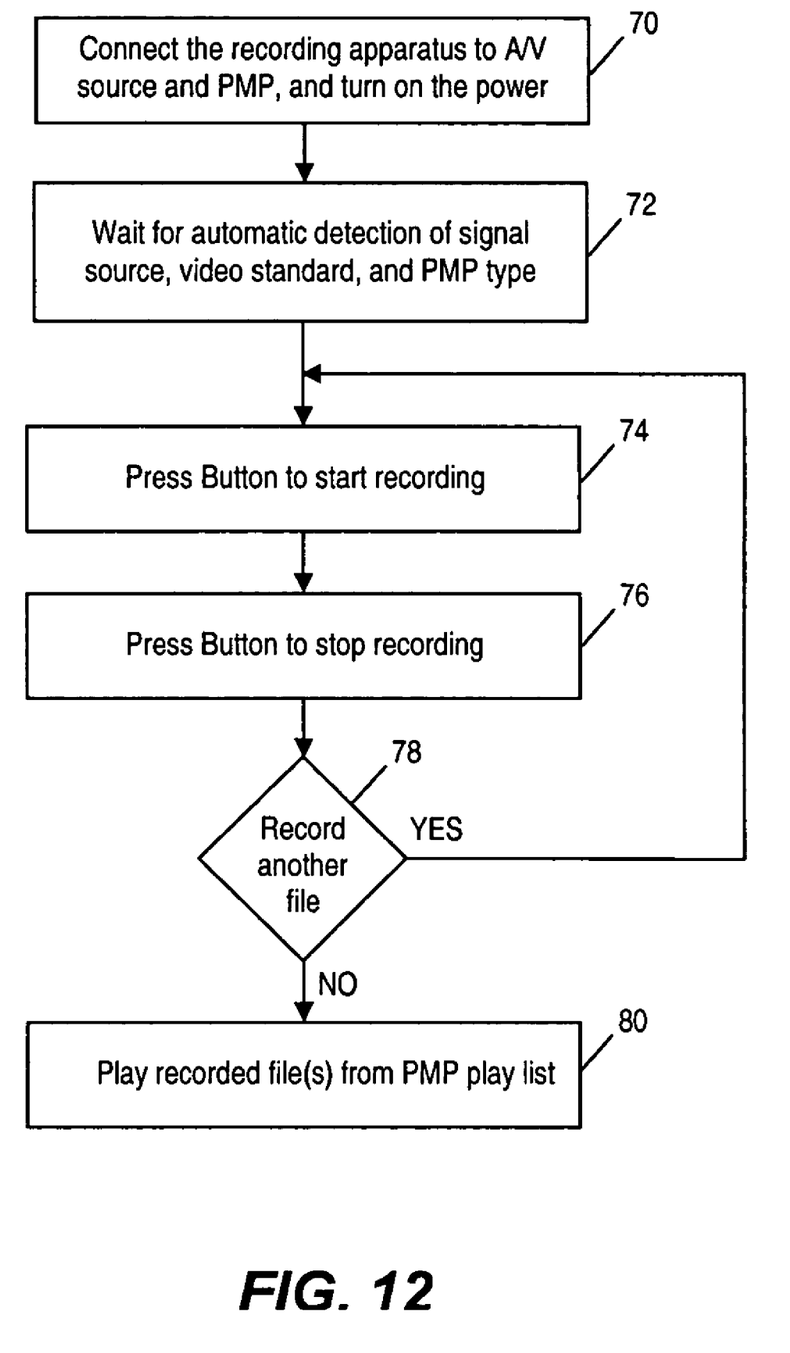

FIG. 12 illustrates another operational flow of one embodiment of the recording apparatus 10. At block 70, the recording apparatus 10 is connected to the A/V input source 22 and the portable media player 24. The recording apparatus 10 is then powered up. At block 72, the recording apparatus 10 performs its initialization procedures, such as, automatic detection of signal source, video standard and portable media player type. At block 74, the user activates the recording process by pressing the record button 40 on the recording apparatus 10. In response, the recording apparatus 10 processes and transfers the A/V contents from the A/V input source 22 to the portable media player 24 for playback and/or storage. At block 76, the user may discontinue the recording process by pressing the record button 40 again. At block 78, the user may choose to record another A/V file. If so, the processes at blocks 74, 76 are repeated again. If not, at block 80, the user may play the recorded A/V contents on the portable media player 24 by selecting the appropriate file from a play list.

Figure 13:
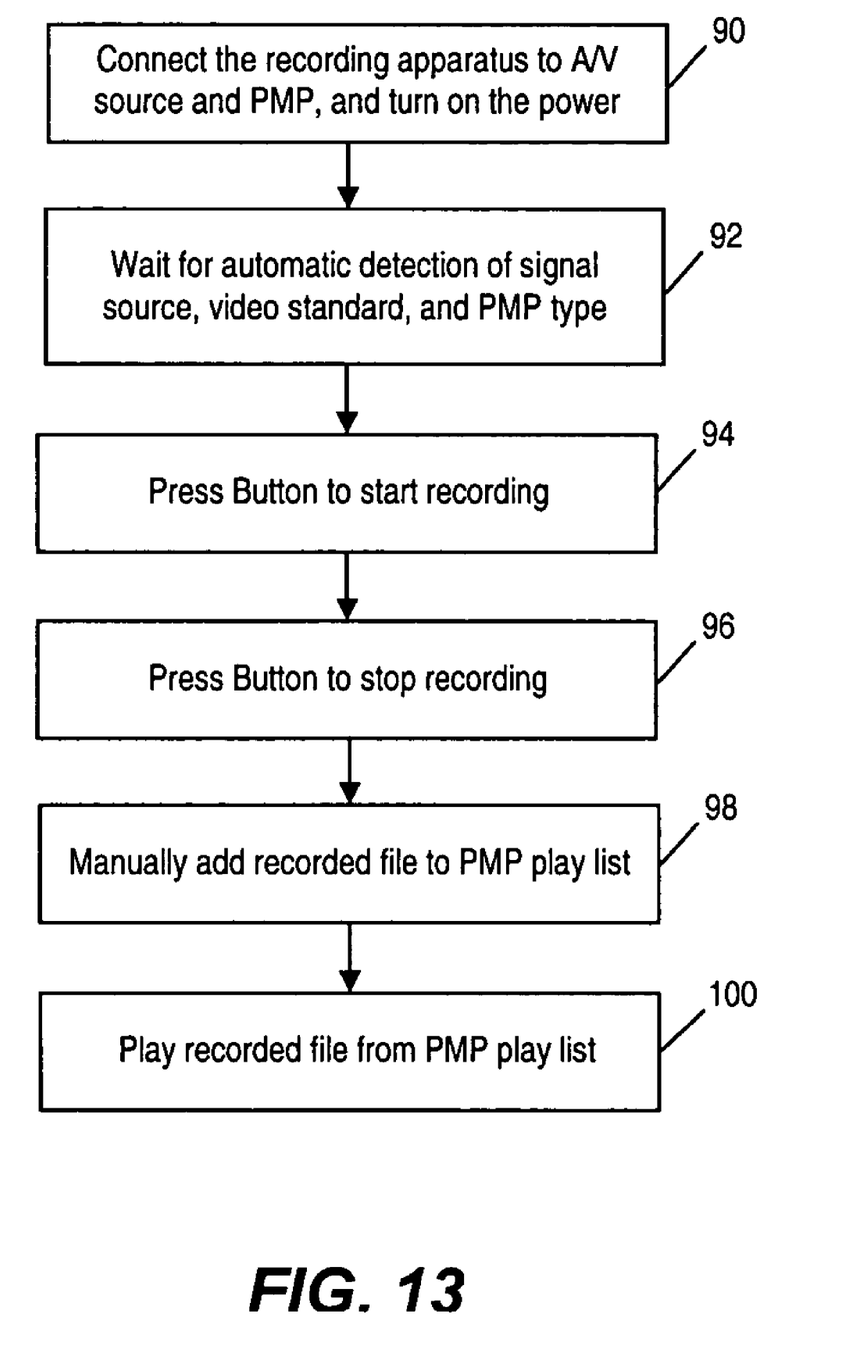

FIG. 13 illustrates a further operational flow of one embodiment of the recording apparatus 10. At block 90, the recording apparatus 10 is connected to the A/V input source 22 and the portable media player 24. The recording apparatus 10 is then powered up. At block 92, the recording apparatus 10 performs its initialization procedures, such as, automatic detection of signal source, video standard and portable media player type. At block 94, the user activates the recording process by pressing the record button 40 on the recording apparatus 10. In response, the recording apparatus 10 processes and transfers the A/V contents from the A/V input source 22 to the portable media player 24 for playback and/or storage. At block 96, the user may discontinue the recording process by pressing the record button 40 again. At block 98, the user may manually add the recorded A/V file to a play list associated with the portable media player 24. At block 100, the user may then play the recorded A/V file on the portable media player 24 by selecting the appropriate file from the play list.

Figure 14:
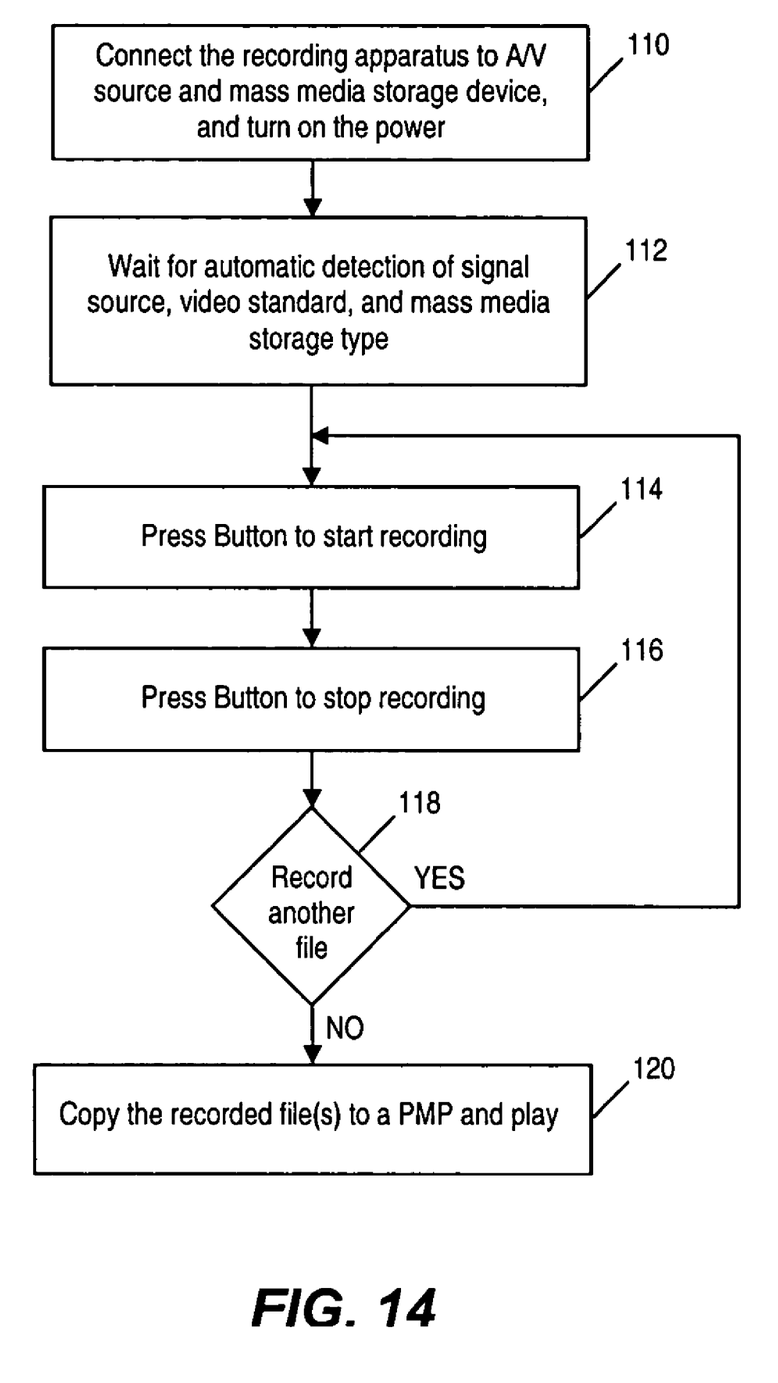

FIG. 14 illustrates another operational flow of one embodiment of the recording apparatus 10. At block 110, the recording apparatus 10 is connected to the A/V input source 22 and the general purpose storage device 26. The recording apparatus 10 is then powered up. At block 112, the recording apparatus 10 performs its initialization procedures, such as, automatic detection of signal source, video standard and storage device type. At block 114, the user activates the recording process by pressing the record button 40 on the recording apparatus 10. In response, the recording apparatus 10 processes and transfers the A/V contents from the A/V input source 22 to the general purpose storage device 26 for storage. At block 116, the user may discontinue the recording process by pressing the record button 40 again. At block 118, the user may choose to record another A/V file. If so, the processes at blocks 114, 116 are repeated again. If not, at block 120, the user may copy the recorded A/V contents from the general purpose storage device 26 to the portable media player 24 and play the recorded A/V contents on the portable media player 24 by selecting the appropriate file from a play list.

One advantage of the present invention is its ability to record analog and/or digital A/V contents directly to a portable media player in one step, without requiring any intermediate storage. The stored contents can be played back by the portable media player 24 immediately upon stopping the recording. Alternatively, the stored contents can be played back by the portable media player 24 simultaneously as the recording takes place, thereby allowing a user to watch what is being recorded onto the portable media player 24.

Furthermore, in this context, the recording apparatus 10 gives portable media player users the option of managing their own play lists or allowing the recording apparatus to update the play lists automatically. In the first option, the recording apparatus 10 treats a portable media player 24 as any other mass storage device and the play lists are left untouched, while in the latter option, the portable media player file structure and play lists are updated to allow instant playback of the recorded contents.

Moreover, the recording apparatus 10 may also be configured to control and use some of the resources available on the portable media player 24, including, for example, display screen, buttons, and memory. Such resources may be used to receive input from the user and/or display output to the user.

Another advantage of the present invention is its simplicity and ease of use whereby transfer of the A/V contents involves no additional devices other than the A/V input source 22, the recording apparatus 10 and the portable media player 24 and/or the general purpose storage device 26. An embodiment of the present invention may further provide a one-button control interface to a user. By clicking the button once, the user may initiate the transferring of the A/V contents onto the portable media player without any other input from the user. In other words, only a single user interaction, such as, pressing the button once, is needed to effect the transfer process. It should be noted that the scope of the present invention is not limited by the number or type of button(s) used in the control interface. A button may be a switch or key of any type, a touch sensor, part of a touch screen, or any other electronic or mechanical device. The user of the present invention does not require any knowledge or experience in operating a computer or any other signal processing device other than the portable media player and the recording apparatus. Despite this simplicity, an embodiment of the present invention may provide elaborate control of the recording apparatus to an advanced user through configuration data that may be stored as a data file, array, structure, or any other format. The configuration data may reside in the portable media player or in any other storage device. The configuration data is handled by a configuration module and may provide control of all the device parameters including the type of encoders/decoders, the bit-rates, duration of recording and other parameters.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for facilitating a recording of audio/visual (A/V) data, the system comprising:
an A/V input source configured to provide the A/V data;
a portable media player having a repository; and
a recording apparatus located in a unit separate from the portable media player, coupled between the A/V input source and the portable media player, and configured to convert the A/V data from the A/V input source into converted A/V data having a format compatible with the portable media player and to store the converted A/V data directly in the repository of the portable media player without storing the converted A/V data in intermediate storage, said recording apparatus comprising an input module configured to receive the A/V data from the A/V input source and to generate received A/V data, a converter module configured to convert the received A/V data into the converted A/V data, an output module configured to transfer the converted A/V data directly to the repository of the portable media player, a configuration module coupled to the input module, the converter module and the output module, and coupled to receive recording parameters from the portable media player and to configure the input module, the converter module and the output module according to the recording parameters so as to automatically generate the converted A/V data in the format compatible with the portable media player, and a user interface module coupled to the input module, the converter module and the output module, and configured to receive commands from a user, said user interface module including a single button,
wherein upon power-up the recording apparatus is configured to automatically detect a format and nature of the A/V data from the A/V input source and a type of the portable media player, and to initiate the recording of the A/V data, including reception of the A/V data from the A/V input source, conversion of the A/V data by the converter module, and transfer of the converted A/V data from the output module to the portable media player, in response to the user interface module detecting a first press of the button and to stop the recording of the A/V data and automatically update a play list in the portable media player in response to a second press of the button, in each instance without any other input from the user.

2. The system of claim 1 wherein the recording apparatus is further configured to output the converted A/V data in accordance with a plurality of specified recording parameters.

3. The system of claim 1 wherein the converted A/V data directly stored in the repository of the portable media player can be played back by the portable media player immediately upon stopping the recording of the A/V data.

4. The system of claim 1 wherein the recording of the A/V data involves no additional devices other than the A/V input source, the recording apparatus and the portable media player.

5. The system of claim 1 wherein the recording apparatus is further configured to update a play list associated with the portable media player upon completion of a recording session.

6. The system of claim 1 wherein the A/V data provided by the A/V input source includes audio-visual data, audio-only data, video-only data, or still image data.

7. The system of claim 1 wherein the recording apparatus is further configured to perform automatic storage media detection.

8. The system of claim 1 wherein the repository of the portable media player includes any one of a hard disk, a flash drive, a memory stick, a compact flash, a SD card, a multimedia card and a random access memory.

9. The system of claim 1 wherein the A/V data provided by the A/V input source is a digital bit-stream in compressed or uncompressed form streaming from a network source or read from the portable media player or a general purpose storage device.

10. The system of claim 1 wherein the A/V data provided by the A/V input source is compatible with at least one of a plurality of analog video standards including CVBS, S-Video, Component Video and RGB.

11. The system of claim 1 wherein the A/V data provided by the A/V input source is compatible with at least one of a plurality of digital video standards including ITU-R BT.656, DVI, HDMI and LVDS.

12. The system of claim 1 wherein the A/V input source provides the A/V data in the form of a digital bit-stream that is compressed by at least one of a plurality of video and audio compression standards including MPEG1, MPEG2, MPEG4, H.263, H.264, MP2, AC-3, MP3 and AAC.

13. The system of claim 1 wherein the A/V data provided by the A/V input source includes analog audio signals that are single-channel or multiple-channel.

14. The system of claim 1 wherein the A/V data provided by the A/V input source includes digital audio signals that are single-channel or multiple-channel and compatible with at least one of a plurality of formats including I2S and PCM.

15. The system of claim 1 wherein the recording apparatus is further configured to perform automatic detection of audio and video sources and automatic detection of video standards including PAL, NTSC and SECAM video standards.

16. The system of claim 1 wherein the recording apparatus is further configured to perform automatic portable media player detection, in which a brand, make, or type of the portable media player is identified automatically.

17. The system of claim 1 wherein the recording apparatus is coupled to the portable media player by at least one of a plurality of wired or wireless methods including USB, Ethernet, FireWire, BlueTooth, InfraRed and Wi-Fi.

18. The system of claim 1 wherein the A/V input source includes one of a set top box, a television, a camcorder, a video camera, a digital camera, a DV camera, a DVR, a VCR, a DVD player, an RF tuner or any other media receiving, playing or recording device.

19. The system of claim 1 wherein the recording apparatus is portable.

20. The system of claim 1 wherein the portable media player includes a plurality of resources; and wherein the recording apparatus is further configured to control and use one or more of the plurality of resources associated with the portable media player.

21. The system of claim 1 wherein the converted A/V data being directly stored to the repository of the portable media player can be simultaneously played back by the portable media player while the converted A/V data is being stored.

22. The system of claim 1 wherein the button is one or more of a switch, a key, a touch sensor, a part of a touchscreen display, an electronic device and a mechanical device.

23. An apparatus for facilitating a recording of audio/visual (A/V) data, the apparatus comprising:
an input module configured to receive the A/V data from an A/V input source and to generate received A/V data;

a converter module configured to convert the received A/V data into converted A/V data having a desired format;

an output module configured to transfer the converted A/V data directly to a repository of a portable media player without storing the converted A/V data in intermediate storage, the portable media player being separate from the apparatus for facilitating the recording of the A/V data;

a configuration module coupled to the input module, the converter module and the output module, and configured to receive from the portable media player recording parameters and to configure the input module, the converter module and the output module according to the recording parameters so as to automatically generate the converted A/V data in a format appropriate for the portable media player a user interface module coupled to the input module, the converter module and the output module, and configured to receive commands from a user, said user interface module including a single button, wherein upon power-up the apparatus is configured to automatically detect a format and nature of the A/V data from the A/V input source and a type of the portable media player, and to initiate the recording of the A/V data, including reception of the A/V data by the input module, conversion of the received A/V data by the converter module and transfer of the converted A/V data to the portable media player by the output module, in response to the user interface module detecting a first press of the button and to stop the recording of the A/V data and automatically update a play list in the portable media player in response to a second press of the button, in each instance without any additional input from the user.

24. The apparatus of claim 23 wherein the format appropriate for the portable media player is selected by the configuration module from a plurality of formats.

25. The apparatus of claim 23 wherein the recording of the A/V data is effected in real-time as the A/V data is being played by the A/V input source.

26. The apparatus of claim 23 wherein the recording of the A/V data is effected faster than real-time or slower than real-time.

27. The apparatus of claim 23 further comprising:
a remote control device configured to allow the user to issue the command to the user interface module.

28. The apparatus of claim 23 wherein the apparatus is portable.

29. The apparatus of claim 23 wherein the apparatus is stand-alone.

30. The apparatus of claim 23 wherein the apparatus is housed in at least one of a plurality of devices including a set top box, a television, a video camera, a camcorder, a DVD player, a VCD player, a DVR and a VCR.

31. The apparatus of claim 23 wherein the converter module is further configured to encode and/or transcode the received A/V data to the desired format by at least one of a plurality of compression algorithms including MPEG1, MPEG2, MPEG4, H.263, H.264, MP2, AC-3, MP3 and AAC.

32. The apparatus of claim 23 wherein the desired format of the converted A/V data includes at least one of a plurality of formats including MP4, MOV, AVI, ASP and MPG.

33. The apparatus of claim 23 wherein the converted A/V data are compatible with one of a plurality of file systems including FAT32, FAT16, HFS, HFS+, Ext2, Ext3 and NTFS.

34. The apparatus of claim 23 wherein the output module is further configured to interface with the portable media player and perform automatic portable media player detection, in which a brand, make, or type of the portable media player is identified automatically.

* * * * *